Feb. 17, 1931. H. D. HUME 1,792,743
ASSEMBLY TOOL
Filed Feb. 4, 1929

Inventor
Horace D. Hume.
By Herbert E. Smith
Attorney

Patented Feb. 17, 1931

1,792,743

UNITED STATES PATENT OFFICE

HORACE D. HUME, OF GARFIELD, WASHINGTON

ASSEMBLY TOOL

Application filed February 4, 1929. Serial No. 337,449.

My present invention relates to an improved assembly tool designed for use by mechanics and others in the process of replacing the oil pan, or bottom, on the crank case of an internal combustion engine. The device of my invention is a hand tool, and a plurality of these tools are employed for temporarily retaining the gasket-sections in position on the top edge of the oil pan as it is being attached to the crank case in the first instance, or as the pan is being replaced beneath the crank case, after repairs to parts within the crank case of the motor. In many standard types of motors, the gasket located between the bottom edge of the crank case and the top edge of the oil pan, is made up of four sections, two of which sections have angular strips at their ends, and the other two, which fit in the depressions or semi-circular pockets at the opposite ends of the pan, overlap the ends of these angular strips. The gasket sections which are fashioned of flexible material, as leather, are first laid on the top flanged edge of the oil pan, and as the sections are light, and consequently are readily displaced, great difficulty is experienced in holding the sections in proper position so that they will be effective when clamped between the pan and crank case.

The primary object of my invention is the provision of an assembly tool (four of which are used as a set) or gasket-holder by means of which the gasket sections or strips are held on the top of the oil pan-flange, against accidental displacement, while the pan is being applied to position beneath the crank case, in order that the packing gasket may be clamped in proper position to prevent leak between the crank case and pan. After the pan has been attached to the crank case, the assembly tools are removed.

In the accompanying drawings I have illustrated one complete example of the physical embodiment of my invention, constructed according to the best mode I have thus far devised for the practical application of the principles of my invention, and the tools are combined and arranged in the manner required for their use.

In order that the general assembly, relation of parts, and utility of the tools may readily be understood I have shown a well known type of oil pan 1, having the outwardly projecting, horizontal flanges 2 at its side edges and end edges, and the alined, semi-circular or curved flanges 3 at the opposite ends of the pan to accommodate the bearings.

Figure 1:
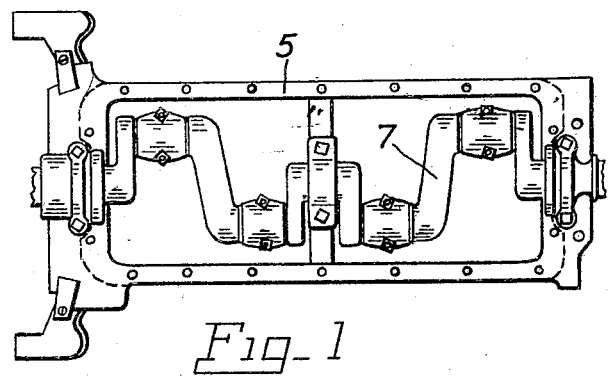
Figure 1 is a plan view showing the under-side of the crank case, and the crank shaft therein, the oil pan being removed to show the location of the gasket.
Figure 2:
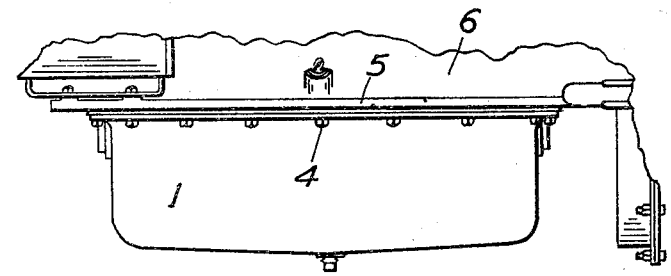
Figure 2 is a side view showing the oil pan bolted to the crank case, with the gasket therebetween.
Figure 3:
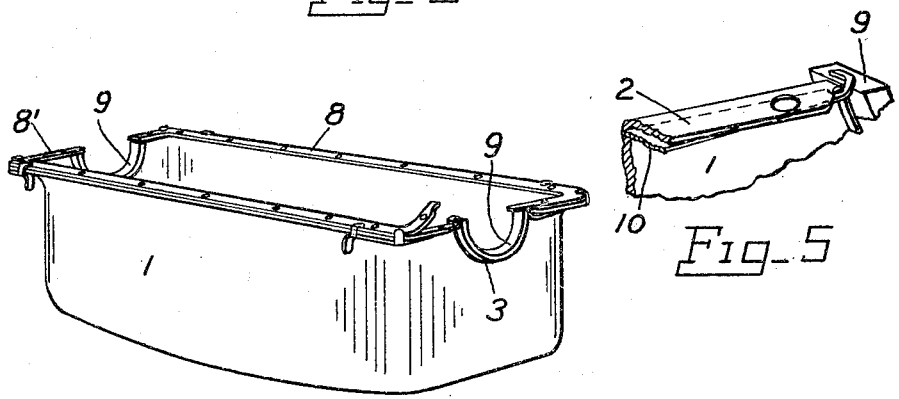
Figure 3 is a perspective view of the oil pan, detached, and illustrating the use of the assembly tools with the gasket sections, at the four corners of the rectangular pan.
Figure 5:
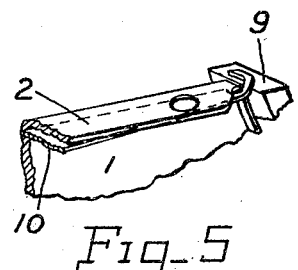
Figure 5 is an enlarged, detail perspective view showing a portion of one of the tools in its relation to the flange of the pan and a gasket-strip or section.
Figure 4:
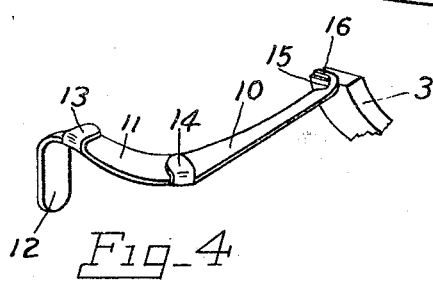
Figure 4 is a perspective view of one of the tools, showing its relation to the semi-circular bearing flange at an end of the pan.

By the usual bolts 4 the pan is attached at the under sides of the flanges 5 on the lower edge of the crank case 6, and the crank shaft 7 is indicated in Figure 1.

The gasket, which is fashioned of flexible material as leather, composition cork, or other suitable packing material, is fashioned of two side strips or sections 8 having angular ends 8', and a pair of straight strips 9. The side strips and their angular ends cover the side flanges of the pan and portions of the end flanges, and the strips 9 are laid on the curved flanges 3 of the pan. The sections are of course provided with bolt holes complementary to the holes in the flanges of the pan and of the crank case, and the bolts pass through the holes of the gasket as well as those of the flanges.

When placed in position, the ends of the curved strips overlap the adjoining ends of the angular ends 8' of the side strips, and the assembly tools are utilized at the four corners of the pan to hold the side strips and the overlapping curved strips, temporarily, in position, while the pan, with the gasket thereon, is being applied to the bottom of the crank case.

A set of the tools comprises two pairs, and the tools of the pairs are interchangeable, thus providing two pairs of duplicate tools. The tools are stamped or struck from thin sheet metal and are of sufficient rigidity, and the required resiliency, to permit facility in applying them and equal facility in withdrawing them from their holding positions, after the pan is put in place.

Each tool comprises a long, flat arm 10 and a shorter, angular arm 11, shaped to conform to the corner of the pan, and a handle 12 is fashioned at one end of the tool to facilitate its manipulation.

Two hooks 13 and 14 are bent or turned inwardly and over the arms, the former over the side arm 11 and the latter over the corner or bend between the side arm 11 and the end arm 10, and these hooks or retaining lugs are spaced above the arms a sufficient distance so that the arms of the tool may be slipped under the flange 2 of the pan 1, while the hooks or lugs engage over the edge of the gasket and project slightly over the top face of the gasket, toward its inner edge.

The handle 12 forms an abutment or stop, as well as a guide, to prevent the tool and gasket being shoved inwardly out of alinement with the flange of the pan, and the side hook or lug 13, and corner hook or lug 14, both assist in holding the gasket strips in proper position.

At the end of the end arm 10 a notch 15 is formed in the inner edge of the arm, and a tongue 16, which extends transversely of the arm, is upset slightly above the plane of the arm 10. The tongue is spaced above the plane of the arm sufficiently to fit over the lapped ends of the portion 8' and the end of the curved strip 9, and thus the overlapping ends of the curved strips as well as the overlapped ends of the angular ends 8', at both ends of the pan, are retained in close relation to the flanges of the pan.

The usual varnish or shellac may be applied to the gasket, and when retained in position by the four tools on the pan, the latter is ready to be applied to the flanges of the crank case. The usual procedure is followed, and the bolts are applied and loosely fastened, after which the assembly tools are withdrawn. The bolts 4 are then tightened, and the gasket, which has been retained in proper position, is clamped between the flanges of the pan and the flanges of the crank case, to insure a leak-proof joint.

Having thus fully described my invention what I claim as new and desire to secure by Letters Patent is:—

1. An L-shaped assembly tool of thin metal having a downturned handle at one end and an up-set inwardly projecting retaining tongue at the other end, and a plurality of up-set retaining lugs projecting inwardly from the outer edge of the tool.

2. An L-shaped assembly tool comprising two arm for holding the overlapping ends of gasket sections, a handle at the end of one arm, the other arm having an end-notch and an up-set, inwardly projecting retaining tongue for engaging the overlapping ends of the gasket sections, and a plurality of retaining, up-set lugs projecting inwardly from the outer edge of the tool.

In testimony whereof I affix my signature.

HORACE D. HUME.